(12) United States Patent
Winer

(10) Patent No.: US 9,292,203 B2
(45) Date of Patent: Mar. 22, 2016

(54) PROVIDING A VERTICAL CANDIDATE BAR WITH AN ON-SCREEN KEYBOARD

(75) Inventor: Morgan H. Winer, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 482 days.

(21) Appl. No.: 13/468,955

(22) Filed: May 10, 2012

(65) Prior Publication Data

US 2013/0300664 A1     Nov. 14, 2013

(51) Int. Cl.
| | |
|---|---|
| *G06F 3/0489* | (2013.01) |
| *G06F 3/01* | (2006.01) |
| *G06F 3/02* | (2006.01) |
| *G06F 3/0488* | (2013.01) |
| *G06F 17/27* | (2006.01) |
| *G06F 17/28* | (2006.01) |

(52) U.S. Cl.
CPC ............ *G06F 3/04895* (2013.01); *G06F 3/018* (2013.01); *G06F 3/0216* (2013.01); *G06F 3/04886* (2013.01); *G06F 17/276* (2013.01); *G06F 17/2863* (2013.01)

(58) Field of Classification Search
CPC ......... G06F 3/048; G06F 3/41; G06F 17/276; G06F 15/00
USPC ........... 345/168, 173, 169; 715/535, 702, 798
See application file for complete search history.

(56) References Cited

U.S. PATENT DOCUMENTS

| | | | |
|---|---|---|---|
| 6,307,549 B1 | 10/2001 | King et al. | |
| 6,809,725 B1* | 10/2004 | Zhang ............................ | 345/171 |
| 7,043,700 B1 | 5/2006 | Bertram et al. | |
| 7,453,439 B1* | 11/2008 | Kushler et al. ................. | 345/168 |
| 7,721,222 B1* | 5/2010 | Shaik ............................. | 715/773 |
| 8,547,354 B2 | 10/2013 | Koch et al. | |
| 8,564,541 B2 | 10/2013 | Chou | |
| 2005/0141770 A1 | 6/2005 | Marila et al. | |
| 2005/0225538 A1 | 10/2005 | Verhaegh | |
| 2009/0237359 A1* | 9/2009 | Kim et al. ...................... | 345/168 |
| 2010/0245252 A1* | 9/2010 | Ghassabian ................... | 345/169 |
| 2011/0010655 A1 | 1/2011 | Dostie et al. | |
| 2012/0062465 A1* | 3/2012 | Spetalnick ..................... | 345/168 |
| 2012/0120016 A1* | 5/2012 | Mittal et al. ................... | 345/173 |

OTHER PUBLICATIONS

Apple, Inc., "Iphone User Guide for iOS 4.2 and 4.3 Software," Mar. 9, 2011, 274 pages.

* cited by examiner

*Primary Examiner* — Quan-Zhen Wang
*Assistant Examiner* — Yuk Chow
(74) *Attorney, Agent, or Firm* — Morgan, Lewis & Bockius LLP

(57) ABSTRACT

Methods, systems, computer-readable media, and apparatuses for providing a vertical candidate bar with an on-screen keyboard are presented. In some embodiments, a computing device may display a keyboard on a touch-sensitive display screen. The keyboard may be a split keyboard that includes two panels of keys displayed on opposite sides of the display screen. The device also may display a candidate bar on the display screen, and the candidate bar may be vertically aligned with the keyboard. As character input is received via the keyboard, the device may update the candidate bar to include various candidate characters that are determined based on the received character input.

18 Claims, 10 Drawing Sheets

PROVIDING A VERTICAL CANDIDATE BAR WITH AN ON-SCREEN KEYBOARD

BACKGROUND

Aspects of the disclosure generally relate to computing devices and computer software. In particular, some embodiments relate to improved user interfaces and other user interaction technologies that can be implemented by and/or otherwise be embodied in computing devices and computer software that provide on-screen keyboards.

Increasingly, computer systems and mobile computing devices, such as smart phones and tablet computers, include touch-sensitive display screens that allow users to interact with and/or otherwise provide input to these systems and devices. For example, a mobile computing device may include a touch-sensitive display screen via which user input can be received in the form of taps, swipes, and other gestures that a user may perform on the screen using his or her finger, a stylus, or some other object. The device in turn may manipulate displayed objects (e.g., user interface objects displayed on the screen) based on the user input received via the touch-sensitive display screen.

In some devices, an on-screen keyboard may be provided on a touch-sensitive display screen, so as to facilitate typing or other character entry. For instance, a mobile computing device may display a user interface on a touch-sensitive display screen that includes a plurality of soft keys arranged in a manner that resembles a physical computer keyboard. As user input is received (e.g., as a user taps on the screen in regions in which particular keys of the keyboard are displayed), the device may interpret the user input as character input. This may include displaying the characters that the user typed on the on-screen keyboard in a text entry region of the user interface, for example.

In some instances, the character input entered by the user via the on-screen keyboard may be a phonetic expression of a word or phrase from another language that does not share the same alphabet as the on-screen keyboard. For example, the on-screen keyboard may include characters from the Latin alphabet arranged in a QWERTY layout, which is a common layout for computer keyboards used in the United States of America, but the character input entered by the user may be a phonetic expression of a word or phrase in Chinese or Japanese. In these instances, the user may wish for the device to interpret and display the character input using characters and/or symbols from the other language's alphabet. For example, the user may wish for the device to interpret and display the character input using Pinyin characters and/or symbols (e.g., for phonetic expressions of Chinese words and phrases) or Kana characters and/or symbols (e.g., for phonetic expressions of Japanese words and phrases).

In some situations, however, a phonetic expression of a word or phrase, such as a phonetic spelling of a Chinese word using the Latin alphabet, may correspond to several different characters and/or symbols in another alphabet, such as in Pinyin, and each of these characters may have a different meaning. To resolve this phonetic ambiguity and determine which meaning the user intends and which character should be inserted into the text, it therefore might be necessary to provide the user with a set of candidate characters and prompt the user to select the intended character from the candidates.

In conventional systems, a device may display a horizontal candidate bar above an on-screen keyboard in which candidate characters can be displayed to a user. The candidate characters in the candidate bar may be selectable, such that the user can select a particular candidate that he or she wishes to insert. In a device that features a larger screen, such as a tablet computer, however, a horizontal candidate bar may occupy a large region of the user interface and the display screen, thereby reducing the amount of space in which other objects might be displayed. In addition, using a horizontal candidate bar may reduce the ease and efficiency with which a user can type on the display screen. For instance, if the user is two-thumb typing on the keyboard while holding the device with his or her other fingers, some of the candidates in a horizontal candidate bar might not be reachable by the user's thumbs, and the user might need to change his or her grip to reach some of the candidates displayed in the candidate bar.

BRIEF SUMMARY

Certain embodiments are described that enable a user to type more easily and efficiently on an on-screen keyboard on a device, especially when using a candidate bar. In some embodiments, a candidate bar aligned vertically with an on-screen keyboard is displayed by a device in a way that enables user selection of candidates displayed in the candidate bar in an easy and convenient manner, for instance, by reducing or eliminating the need for the user to change his or her grip on the device. The vertical orientation of the candidate bar may also minimize the device display area occupied by the candidate bar and the keyboard and, consequently, reduce the extent to which other information displayed by the device might be covered or obstructed by the candidate bar and/or the keyboard.

In some embodiments, a computing device may display a keyboard on a touch-sensitive display screen. The keyboard may be a split keyboard that includes two panels of keys displayed on opposite sides of the display screen in an arrangement that may allow a user to type more easily using his or her thumbs (e.g., referred to as "thumb typing" or "two-thumb typing") while holding the device with his or her other fingers. The device also may display a candidate bar on the display screen, and the candidate bar may be vertically aligned with the keyboard. As character input is received via the keyboard, the device may update the candidate bar to include various candidate characters that correspond to the received character input. The candidate characters may be individual letters or they may be words, phrases, numbers, or the like.

In some embodiments, the character input used for determining candidates may be received from one or more keys on one or both panels of the keyboard. In some embodiments, the candidate bar may be scrollable, as this may enable a greater number of candidate characters to be offered to the user while reducing the amount of screen space used by the candidate bar. In some embodiments, as the device receives additional character input via the keyboard, the device may update the candidate bar to include additional or alternative candidate characters based on the additional character input. In some embodiments, the candidate bar may be displayed adjacent to one of the panels of the keyboard. In some embodiments, the keyboard and the candidate bar may be displayed as an overlay on top of other content displayed on the screen.

DETAILED DESCRIPTION

Figure 1:
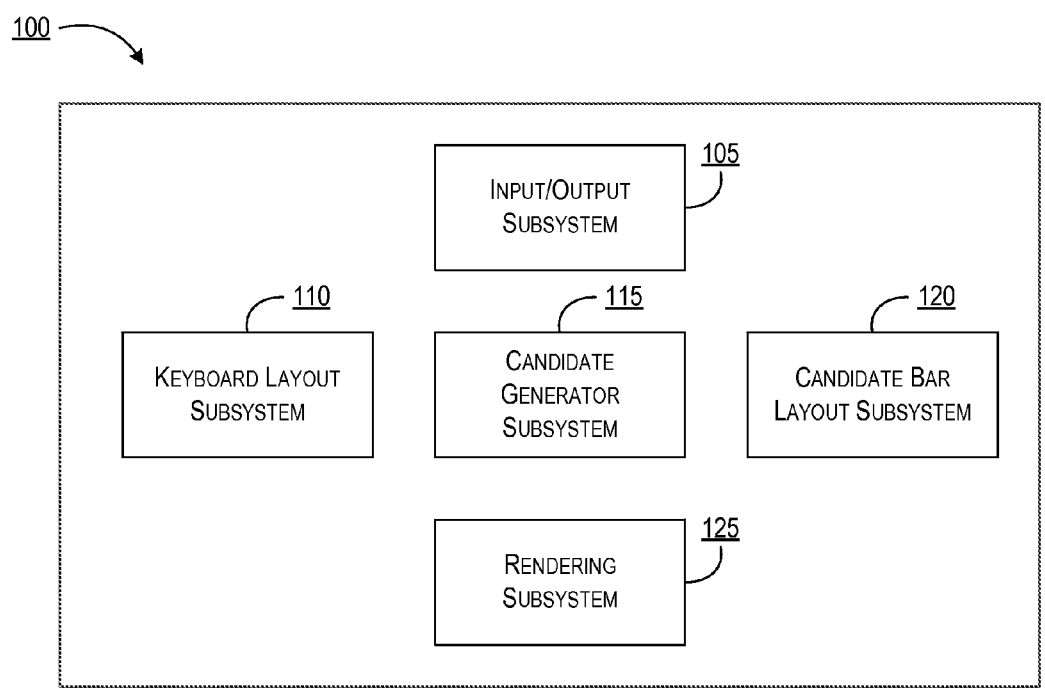
FIG. 1 illustrates a simplified diagram of a system that may incorporate one or more embodiments of the invention.

In the following description, for the purposes of explanation, specific details are set forth in order to provide a thorough understanding of embodiments of the invention. However, it will be apparent that various embodiments may be practiced without these specific details.

Certain embodiments of the present invention relate to user interface features that allow a user to type more easily and efficiently on a keyboard displayed on a touch-sensitive display screen.

In some embodiments, a device may display a user interface element, referred to as a candidate bar, which includes one or more candidates that can be selected by a user for insertion into a document (or other text being composed on the device) in place of character input actually entered by the user. The candidate bar may be displayed in combination with an on-screen keyboard via which the user may be able to enter the character input, and the candidates may be generated based on the character input. Furthermore, in some embodiments, the candidate bar may be a vertical candidate bar, and the on-screen keyboard may be a split keyboard that includes two or more panels of keys.

In some embodiments, a computing device, such as a tablet computer (e.g., an iPad® from Apple Inc. of Cupertino, Calif.), may provide a vertical candidate bar along with an on-screen keyboard so as to allow a user to select candidate characters more easily and efficiently. In particular, because the vertical candidate bar may be positioned closer to an edge of the tablet computer's display screen, a user might not need to lift his or her thumbs away from the region of the display screen in which the on-screen keyboard is displayed in order to select a candidate from the candidate bar. Rather, the user may be able to type on the on-screen keyboard and select candidates using his or her thumbs, while continuing to hold the device with his or her other fingers.

As noted above, the candidate characters may represent characters or symbols from an alphabet different from the alphabet used by the keyboard. For example, the candidate characters may be Chinese Pinyin characters or Japanese Kana characters that correspond to words and phrases in Chinese or Japanese, respectively, while the on-screen keyboard may primarily include characters from the Latin alphabet. To facilitate transcription between the different alphabets or character sets, the user may provide character input via the on-screen keyboard that includes a phonetic spelling of a word or phrase that can be expressed using characters or symbols from the other alphabet. For instance, the user may enter via the on-screen keyboard, a phonetic expression of a Chinese phrase using Latin characters (e.g., "Ni hao," which is a phonetic spelling that can correspond to the Chinese phrase for "Hello"). In order to resolve the ambiguity of which Chinese Pinyin character is intended by the phonetic expression "Ni hao," the device may display various candidate characters in the vertical candidate bar, and subsequently may insert a particular character candidate into the text being composed, based on the user selecting the particular candidate character from the vertical candidate bar.

As illustrated in the example above, the candidates included in a candidate bar may, in some embodiments, be determined based on character input provided by a user. A device, such as a tablet computer, may determine one or more candidates to be included in a candidate bar by analyzing the character input provided by the user, which may be entered via an on-screen keyboard, using character correspondence information and/or one or more candidate generation algorithms to identify particular character candidates that may correspond to the character input. Furthermore, the candidates that are identified as potentially corresponding to the character input may, in some embodiments, be ranked using the character correspondence information and/or the candidate generation algorithms, such that more highly ranked candidates may be more prominently displayed in the candidate bar than less highly ranked candidates.

Various embodiments will now be discussed in greater detail with reference to the accompanying figures, beginning with FIG. 1.

FIG. 1 illustrates a simplified diagram of a system 100 that may incorporate one or more embodiments of the invention. In the embodiment illustrated in FIG. 1, system 100 includes multiple subsystems including an input/output subsystem 105, a keyboard layout subsystem 110, a candidate generator subsystem 115, a candidate bar layout subsystem 120, and a rendering subsystem 125. One or more communication paths may be provided that enable the one or more subsystems to communicate with and exchange data with one another. The various subsystems depicted in FIG. 1 may be implemented in software, in hardware, or in combinations thereof. In some embodiments, the software may be stored on a transitory or non-transitory computer-readable medium and/or be executed by one or more processors.

It should be appreciated that system 100 may include other components than those depicted in FIG. 1. Further, the embodiment shown in FIG. 1 is only one example of a system that may incorporate an embodiment of the invention. In some other embodiments, system 100 may have more or fewer components than those shown in FIG. 1, may combine two or more components, or may have a different configuration or arrangement of components. In some embodiments, system 100 may be part of a portable communications device, such as a mobile telephone, a smart phone, or a multifunction device. Examples of portable communications devices include, without limitation, the iPhone®, iPod Touch®, and iPad® devices from Apple Inc. of Cupertino, Calif. In some other embodiments, system 100 may also be incorporated in other devices such as desktop computers, kiosks, and the like.

In some embodiments, input/output ("I/O") subsystem 105 may provide an interface that allows a user to interact with system 100. For instance, I/O subsystem 105 may enable system 100 to output information to the user. For example, I/O subsystem 105 may include a display device, such as a monitor or a screen. Additionally or alternatively, I/O subsystem 105 may include one or more input devices that allow a user to provide input to system 100. The input devices may include, without limitation, a mouse, a pointer, a keyboard, or other input devices. In some embodiments, I/O subsystem 105 may include a touch-sensitive interface, such as a touch-sensitive display screen (also sometimes referred to as a touch screen), that can both display information to a user and also receive input from the user. For example, I/O subsystem 105 may display an on-screen keyboard and a candidate bar, as well as other user interface elements and/or content, on a touch-sensitive display screen. In addition, I/O subsystem 105 may receive one or more user selections via the touch-sensitive display screen, such as one or more user selections of keys of the on-screen keyboard and/or one or more user selections of candidates included in the candidate bar.

In some embodiments, keyboard layout subsystem 110 may enable system 100 to provide on-screen keyboards having a variety of different layouts. For example, keyboard layout subsystem 110 may store keyboard layout information that specifies properties of different keyboard layouts, such as information defining the character keys and/or other keys (e.g., function keys, such as a "space" key, a "delete" key, a "menu" key, etc.) to be included in particular keyboards. The keyboard layout information also may include information defining the size and position of the keyboard, the various keys included in the keyboard, and the one or more panels on which the keys of the keyboard can be displayed. For example, keyboard layout subsystem 110 may, in some embodiments, store keyboard layout information defining a split keyboard that includes multiple panels of keys. Such keyboard layout information may, for instance, define a split keyboard that includes two panels of keys that are configured to be displayed on opposite sides of a display screen. As noted above, this arrangement may allow a user to type more easily on a display screen of a device using his or her thumbs, while holding the device with his or her other fingers.

Additionally or alternatively, keyboard layout subsystem 110 may store keyboard layout preferences that may specify which keyboard layout(s) are to be provided to which user(s) of system 100. For example, the keyboard layout preferences may specify that a first user of system 100 is to be provided with a first keyboard layout (e.g., a Chinese Pinyin keyboard layout) by default and/or be provided with an option to switch to a second keyboard layout (e.g., an English QWERTY keyboard layout), and the keyboard layout preferences further may specify that a second user of system 100 is to be provided with a third keyboard layout (e.g., a Japanese Romaji keyboard layout) by default and/or be provided with an option to switch to a fourth keyboard layout (e.g., an English DVORAK keyboard layout).

In some embodiments, candidate generator subsystem 115 may enable system 100 to generate character candidates to be included in a candidate bar to be displayed by system 100. The one or more candidates may be determined based on input provided by a user, such as character input provided by a user using an on-screen keyboard. In addition, candidate generator subsystem 115 may determine candidates by evaluating input provided by the user via I/O subsystem 105 and/or by comparing the input with stored information about candidates. For example, candidate generator subsystem 115 may store character correspondence information that specifies which candidate characters correspond to which input characters. Additionally, candidate generator subsystem 115 may be configured to receive character input (e.g., from I/O subsystem 105), determine one or more character candidates based on the received character input (e.g., using the character correspondence information), and cause the character candidates to be provided to the user (e.g., by providing information to rendering subsystem 125 of system 100 that causes the character candidates to be displayed in a candidate bar included in a user interface provided by system 100).

In some embodiments, candidate bar layout subsystem 120 may enable system 100 to provide candidate bars having a variety of different layouts. For example, candidate bar layout subsystem 120 may store candidate bar layout information that specifies properties of different candidate bar layouts, such as information defining the number of candidate bars to be displayed with particular keyboard layouts (e.g., one candidate bar, two candidate bars, etc.), the size and position of the candidate bars to be displayed with the particular keyboard layouts (e.g., the alignment of the candidate bar or candidate bars relative to portions of the various possible keyboard layouts, the spacing between candidate characters that can be included in the candidate bar or candidate bars, the scrolling behavior of the candidate bar or candidate bars, etc.). Additionally or alternatively, candidate bar layout subsystem 120 may store candidate bar preferences that may specify which candidate bar layout(s) are to be provided to which user(s) of system 100. For example, candidate bar layout subsystem 120 may store candidate bar layout preferences specifying that a first user of system 100 is to be provided with a vertical candidate bar and further that a second user of system 100 is to be provided with a horizontal candidate bar. Furthermore, candidate bar layout subsystem 120 may cause one or more candidate bars to be provided to a user (e.g., by providing information to rendering subsystem 125 of system 100 that causes the candidate bar(s) to be displayed in a user interface provided by system 100).

In some embodiments, rendering subsystem 125 may enable system 100 to render graphical user interfaces and/or other graphics. For example, rendering subsystem 125 may operate alone or in combination with the other subsystems of system 100 in order to render one or more of the user interfaces displayed by system 100. This may include, for instance, communicating with, controlling, and/or otherwise causing I/O subsystem 100 to display and/or update one or more images on the touch-sensitive display screen included in I/O subsystem 105. For example, rendering subsystem 125 may draw and/or otherwise generate one or more images of a keyboard based on information received from keyboard layout subsystem 110. Additionally or alternatively, rendering subsystem 125 may draw and/or otherwise generate one or more images of candidate bars based on information received from candidate generator subsystem 115 and/or candidate bar layout subsystem 120. In some embodiments, rendering subsystem 125 may periodically poll the other subsystems of system 100 for updated information in order to update the contents of the one or more user interfaces displayed by system 100. In additional and/or alternative embodiments, the various subsystems of system 100 may continually provide updated information to rendering subsystem 125 so as to update the contents of the one or more user interfaces displayed by system 100.

Figure 2:
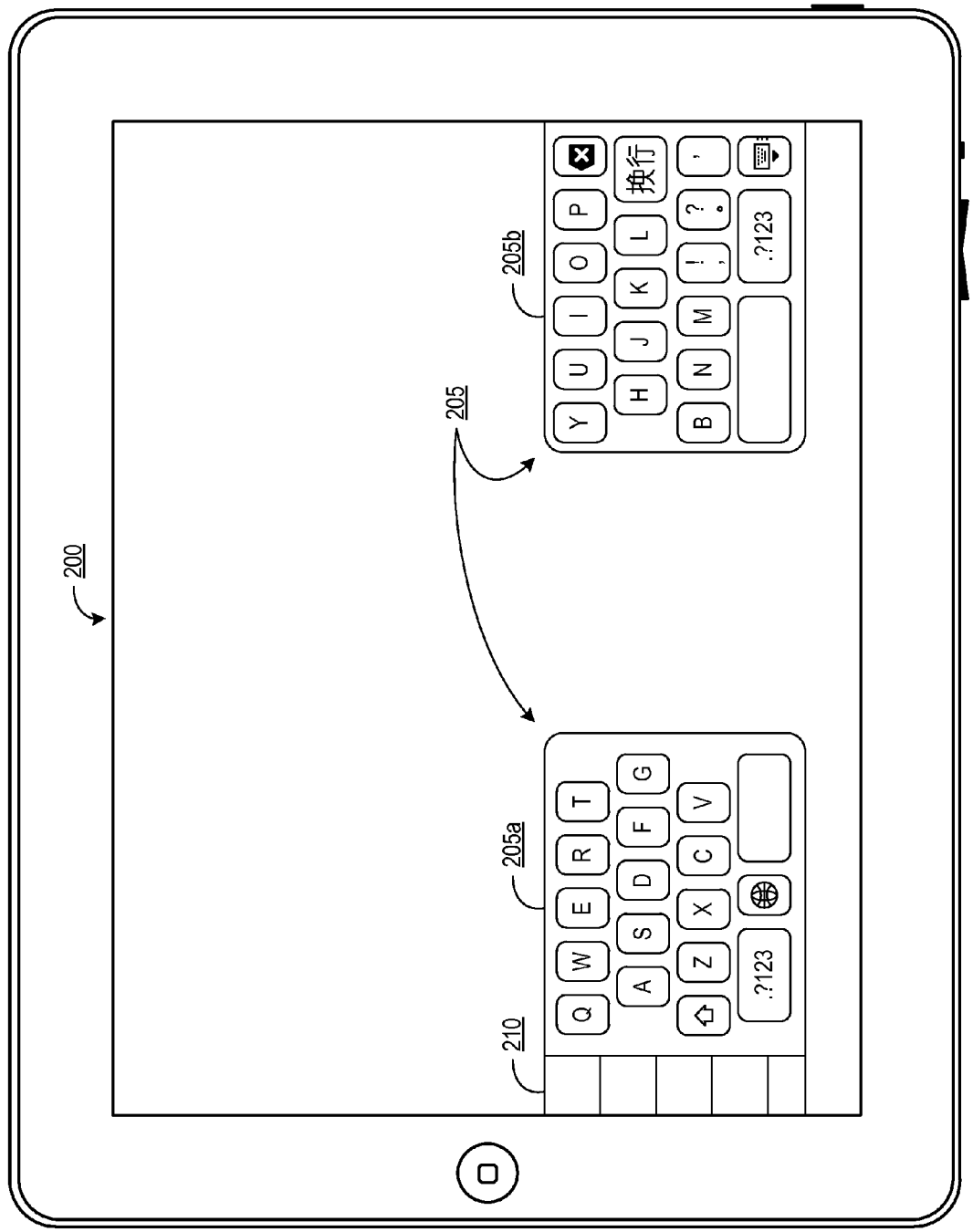
FIG. 2 illustrates an example of a user interface that includes an on-screen keyboard and a vertical candidate bar according to some embodiments.

FIG. 2 illustrates an example of a user interface 200 that includes an on-screen keyboard and a vertical candidate bar according to some embodiments. In particular, as seen in FIG. 2, user interface 200 may include an on-screen keyboard 205 and a vertical candidate bar 210. In some embodiments, on-screen keyboard 205 may be a split keyboard in which one or more keys of the on-screen keyboard 205 are displayed in two or more portions (e.g., two or more panels of keys), such as keyboard panels 205*a* and 205*b*. The terms "panel" and "portion" are used interchangeably in this disclosure to refer to a part of an on-screen keyboard that includes one or more keys of the keyboard. In one or more arrangements, the portions of the split keyboard might not be contiguous with each other. For example, as seen in FIG. 2, the portions of the split keyboard (e.g., keyboard panels 205*a* and 205*b*) may be displayed along different sides of the screen and/or might be separated by other content (e.g., other aspects of user interface 200) that is not part of the keyboard. In other arrangements, on-screen keyboard 205 may be a conventional keyboard in which all of the keys of the on-screen keyboard 205 are included in a single panel.

In addition, in some embodiments, a vertical candidate bar, such as candidate bar 210, may be displayed alongside one portion of the split keyboard, such as keyboard panel 205a. As seen in FIG. 2, candidate bar 210 may include a number of cells in which candidates may be displayed. In addition, the placement of candidate bar 210 next to a portion of split keyboard 205 (e.g., keyboard panel 205a) may allow for easier and more convenient selection of candidates displayed in the cells of candidate bar 210. While candidate bar 210 is illustrated as not including any candidates, a candidate bar may be populated with candidates as input, such as character input provided by a user via keyboard 205, is received. Additional features of the vertical candidate bar, including the ways in which the candidate bar may be populated with candidates, will be discussed in greater detail below.

As noted above, in some situations, the one or more characters typed on the keyboard may correspond to a number of different characters that could potentially be inserted into text being composed or edited. For example, the characters typed on the keyboard may be a phonetic, Latin-alphabet spelling of a Chinese or Japanese word or phrase. These characters may correspond to one or more Chinese or Japanese characters, for instance, which could potentially be inserted into text being composed or edited, instead of or in addition to the Latin-alphabet characters which represent the phonetic spelling of the word or phrase. In order to determine one or more particular characters to be inserted into the text being composed, one or more candidates may be displayed in a candidate bar, such as candidate bar 210, so as to enable the user to select a particular candidate for insertion. A sequence of user interfaces that illustrates various features of candidate bars and various ways in which a candidate bar can be used according to some embodiments will now be described with respect to FIGS. 3-6.

Figure 3:
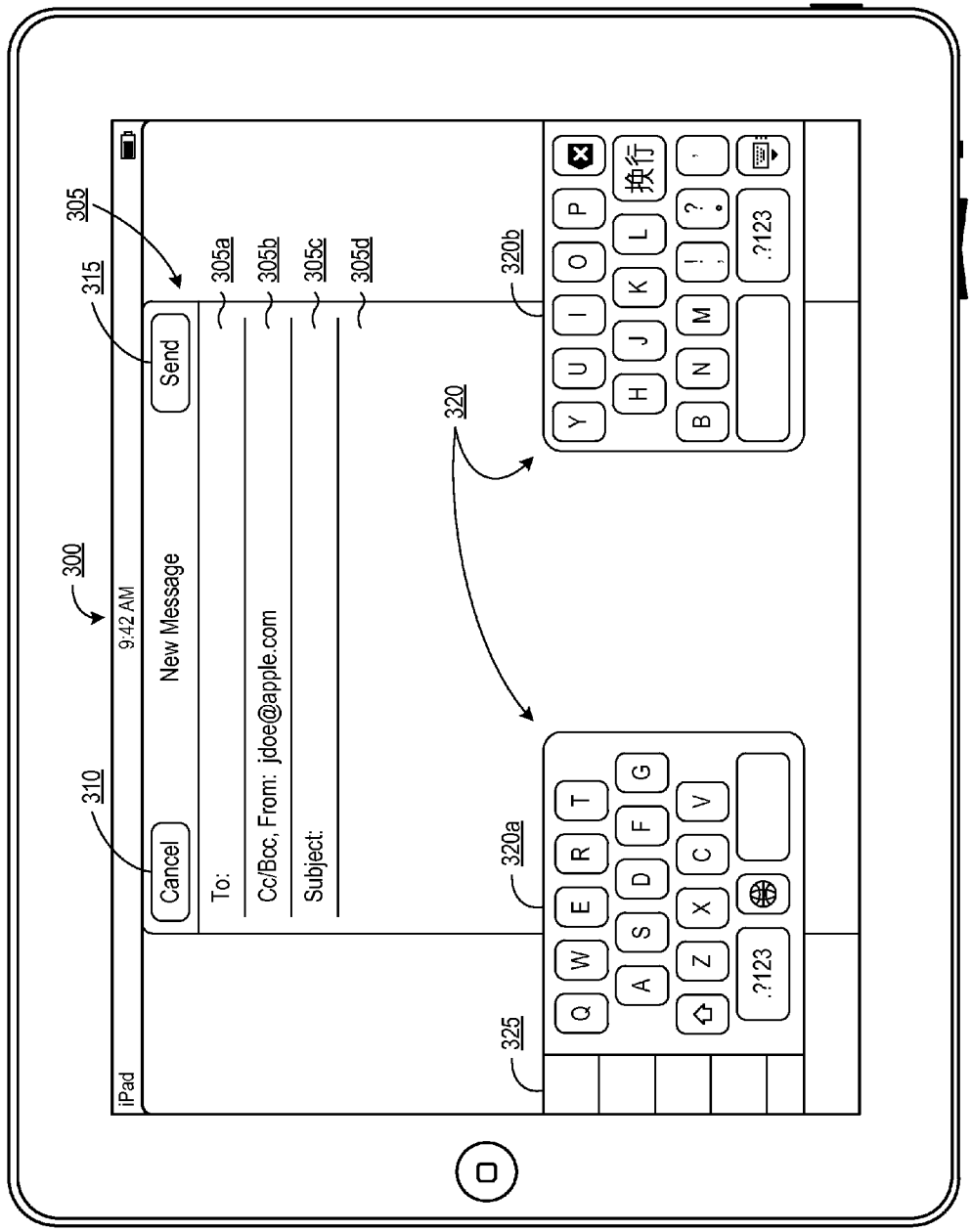
FIGS. 3-6 illustrate additional examples of user interfaces that include an on-screen keyboard and a vertical candidate bar according to some embodiments.

Turning first to FIG. 3, an example user interface 300 is illustrated that implements one or more embodiments. In particular, user interface 300 includes a message composition region 305 in which a user may compose an electronic message, such as an email message or text message, to be sent to one or more other users and/or devices. Message composition region 305 may include several fields in which a user may enter text in order to compose the message and/or otherwise define various aspects of the message being composed. For example, message composition region 305 may include a recipients field 305a in which a user may specify one or more recipient users and/or devices to receive the message. In addition, message composition region 305 may include a sender field 305b in which a user may specify an account or identity from which the message should be sent (e.g., as the user may have multiple accounts or identities capable of sending messages). Message composition region 305 further may include a subject field 305c, in which a user may specify a title for the message, and a body field 305d, in which the user may compose the body of the message.

As seen in FIG. 3, user interface 300 also may include a split keyboard 320 that includes portions 320a and 320b, as well as a vertical candidate bar 325. As depicted in the examples that follow, as character input is provided via split keyboard 320, one or more character candidates may be displayed in vertical candidate bar 325.

In some embodiments, a vertical candidate bar may be aligned with a vertical axis of an on-screen keyboard. For example, as depicted in FIG. 3, vertical candidate bar 325 is aligned with a vertical axis of keyboard 320, relative to user interface 300 and the current orientation of the device and/or the display screen displaying user interface 300. More specifically, vertical candidate bar 325 may have a vertical axis that is parallel to a vertical axis of keyboard 320 and/or parallel to vertical axes of keyboard portions 320a and 320b. In addition, in some instances, the device and/or the display screen may be rotated from a particular, current orientation to a new orientation (e.g., from landscape orientation to portrait orientation). In these instances, the display of the user interface, including the candidate bar and the keyboard, may be reoriented such that the candidate bar (e.g., vertical candidate bar 325) continues to be aligned with a vertical axis of the keyboard (e.g., keyboard 320), relative to the user interface (e.g., user interface 300) and the current orientation of the device and/or the display screen displaying the user interface.

In some embodiments, the vertical candidate bar may be displayed adjacent to the keyboard or a portion of the keyboard. For instance, as illustrated in FIG. 3, vertical candidate bar 325 is displayed adjacent to portion 320a of keyboard 320, and is specifically positioned along an edge of user interface 300 and the display screen displaying user interface 300, in a region between the edge of user interface 300 and portion 320a of keyboard 320.

In some embodiments, a vertical candidate bar and a split keyboard may be displayed as an overlay above other content displayed in the user interface and/or in the display screen. In addition, at least a portion of this other content may be displayed and/or may otherwise be visible between portions of the split keyboard. For example, as illustrated in FIG. 3, vertical candidate bar 325 and split keyboard 320 are displayed as an overlay above other elements of user interface 300. In particular, vertical candidate bar 325 and keyboard portions 320a and 320b are displayed above and/or otherwise appear to be on top of one or more parts of message composition region 305 in user interface 300. In addition, portions of user interface 300 and/or message composition region 305 may be displayed between and/or may otherwise be visible between keyboard portions 320a and 320b of split keyboard 320. For instance, as seen in FIG. 3, at least a part of body field 305d is visible or otherwise uncovered by the overlay of vertical candidate bar 325 and/or keyboard portions 320a and 320b of keyboard 320. By using a vertically-aligned candidate bar with a split keyboard in these ways, more screen space can be used to display substantive parts of user interface 300, such as message composition region 305 and body field 305d, while less screen space can be used to display functional aspects of user interface 300, such as vertical candidate bar 325 and keyboard portions 320a and 320b of split keyboard 320.

By providing an on-screen keyboard with a vertical candidate bar on a device, instead of a conventional, horizontal candidate bar, for instance, not only can more screen space be used to display substantive parts of the user interface, as discussed above, but the usability of the device also can be enhanced. For example, when a user is thumb typing on an on-screen keyboard of a device, while holding the device with his or her other fingers, and one or more candidates are displayed in a horizontal candidate bar, the user might not be able to reach certain parts of the candidate bar (e.g., the central portion of the candidate bar) without changing his or her grip on the device. The grip change involved in selecting a particular candidate from a horizontal candidate bar may reduce the speed at which the user can thumb type on the on-screen keyboard. In addition, this grip change may generally inconvenience the user, as the user may need to reposition both the device, his or her hands, and/or his or her body in order to find a new comfortable typing position. By contrast, if the user were thumb typing on the on-screen keyboard of the device and a vertical candidate bar was displayed (instead of the horizontal candidate bar), all of the candidates displayed in the candidate bar may be within reach of at least one of the user's thumbs, and thus, the user might not need to change his or her grip on the device to select any candidate from the candidate bar. This may allow the user to thumb type more quickly on the on-screen keyboard, while still being able to select one or more candidates for insertion, and further may prevent the user from having to reposition the device, his or her hands, and/or his or her body away from a current typing position.

Figure 4:
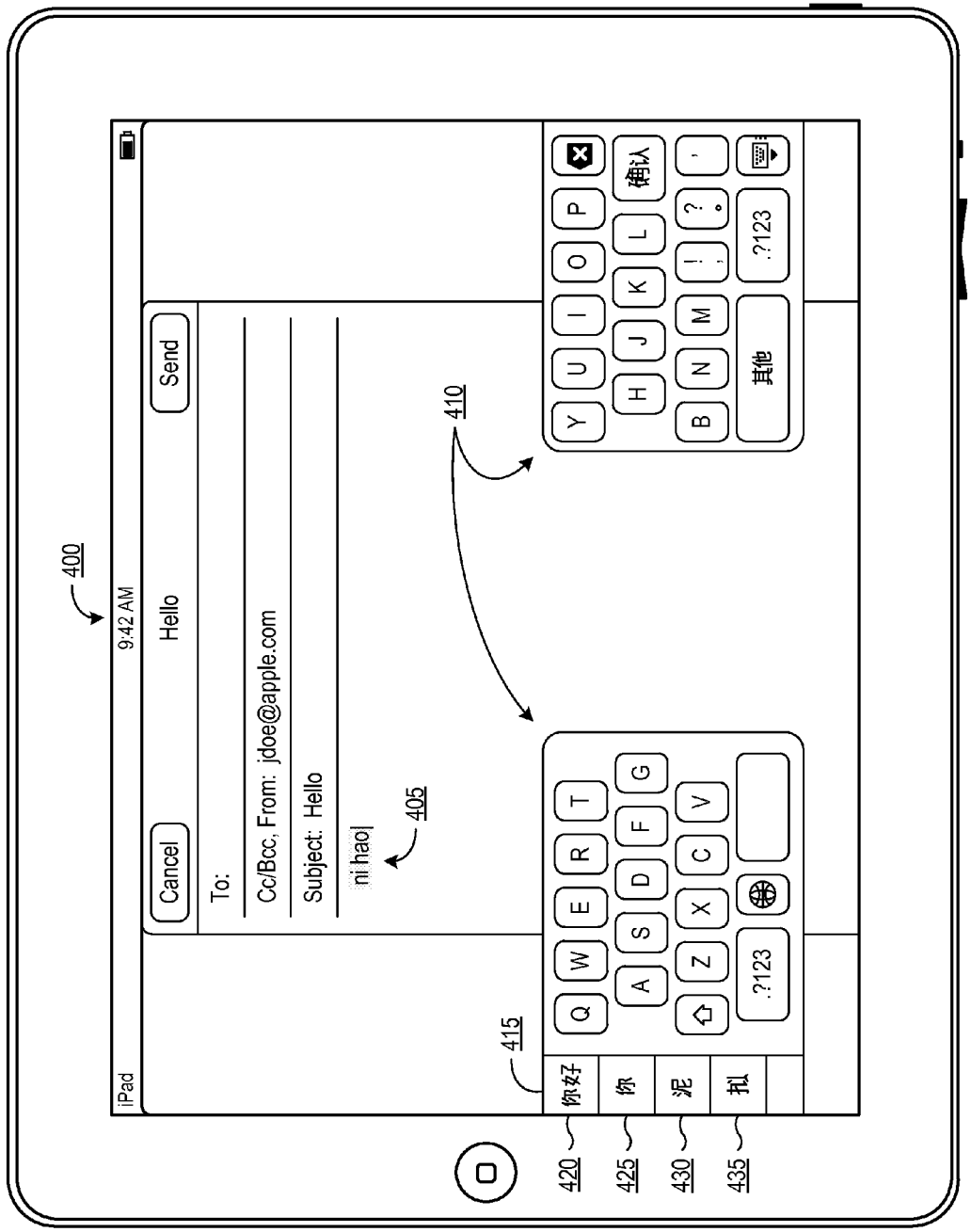

Turning now to FIG. 4, an example user interface 400 is illustrated that includes character input and one or more candidates. In particular, in the example illustrated in FIG. 4, a user may have entered character input 405 by typing on split keyboard 410, and character input 405 may correspond to a linguistic expression (e.g., a word, a phrase, a string of characters, etc.) that has two or more interpretations. For example, character input 405 may be a linguistic expression entered in a first alphabet that has two or more corresponding spellings in a second alphabet different from the first alphabet.

Figure 5:
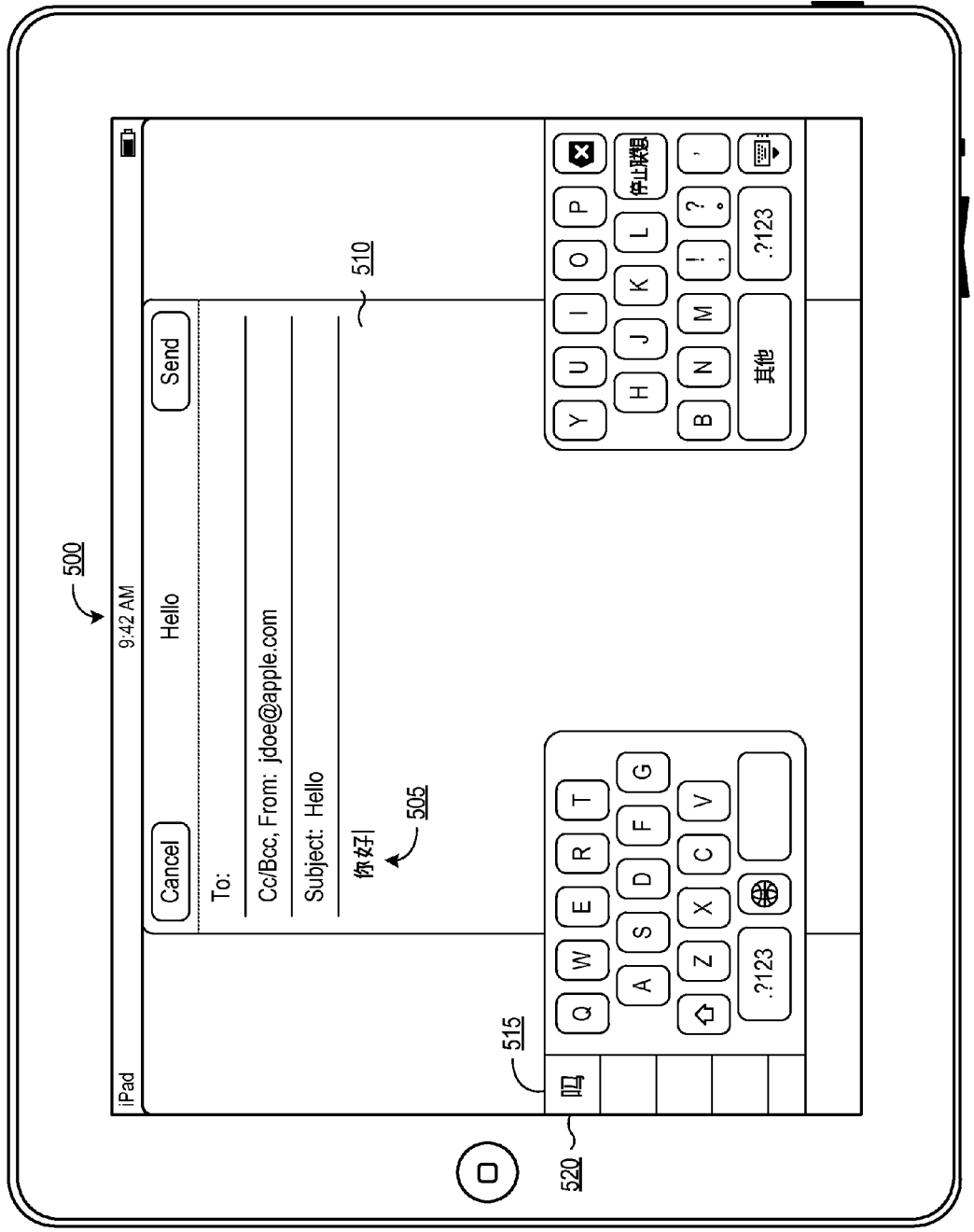

For instance, in the example illustrated in FIG. 4, character input 405 may be the linguistic expression "ni hao," which is a phonetic spelling of a Chinese phrase for "hello," entered in a Latin alphabet. However, there may be multiple Chinese characters that sound like or otherwise phonetically correspond to the linguistic expression "ni hao" and thus may be considered to match or otherwise correspond to the linguistic expression received as character input 405. Accordingly, user interface 400 may include a vertical candidate bar 415 which may display one or more character candidates (e.g., candidates 420, 425, 430, and 435) determined based upon character input 405. For example, these candidates may correspond to Chinese characters that sound like, match, or otherwise correspond to character input 405. In this way, a user may view the character candidates displayed in candidate bar 415 and, if desired, subsequently select one of the character candidates to be inserted into the text, as illustrated in the subsequent user interfaces discussed in this sequence of examples. For example, if the user selects candidate 420 from candidate bar 415, then character input 405 may be replaced with candidate 420, as illustrated in FIG. 5, which is discussed in greater detail below. Alternatively, continuing to refer to FIG. 4, the user might not select any candidate from candidate bar 415, in which case character input 405 may be inserted into the text being composed without being replaced by one or more candidates.

In some embodiments, a vertical candidate bar (e.g., vertical candidate bar 415) may be scrollable, such that the candidate bar may include (or the user interface may otherwise provide) an indication that additional candidates are available and/or may enable the additional candidates to be accessed and selected. For example, in instances where more candidates are available than can fit in candidate bar 415, a user can perform a scroll command on candidate bar 415 (e.g., by performing a swipe or slide gesture on a region of the display screen in which candidate bar 415 is displayed), in order to view additional candidate characters that are included therein and/or that might otherwise correspond to character input 405. Additionally or alternatively, vertical candidate bar 415 may include a control, such as a selectable button, that when selected or otherwise activated may cause candidate bar 415 to be expanded. For example, candidate bar 415 may be expanded by displaying an animation in which candidate bar 415 grows to occupy additional screen space and/or portions of user interface 400. This may allow additional candidates to be displayed to and/or be selected by the user, while reducing (and possibly eliminating) the extent to which a user might have to scroll through a list of candidate characters.

In addition, in some embodiments, the candidates included in a vertical candidate bar may be updated as additional character input is received. For example, the contents of vertical candidate bar 415, including both the character candidates that are visible and the character candidates that are hidden but may become visible if the candidate bar 415 is scrolled, may be updated as additional character input is received via keyboard 410, since the additional character input may alter the linguistic expression to which the candidate characters are matched. This may, for instance, allow a device providing the vertical candidate bar to dynamically respond to user input as it is received.

Additionally, in some embodiments, a vertical candidate bar may include at least one candidate that includes a series of vertically arranged characters. For example, vertical candidate bar 415 may, in some instances, include a candidate that consists of two or more characters that are arranged vertically in a series, e.g., one character on top of another, instead of being arranged horizontally in a series, as English characters are typically arranged. In some embodiments, this vertical arrangement of candidate characters may better represent the manner in which the characters are typically written or displayed in their native alphabet and/or language. For instance, certain characters in Chinese or Japanese might typically be arranged and/or read vertically instead of horizontally, and thus these characters may be displayed in a vertical sequence in candidate bar 415.

Turning now to FIG. 5, an example user interface 500 is illustrated in which one or more candidate characters have been inserted and additional candidate characters are displayed. In particular, in the example illustrated in FIG. 5, a user may have selected one of the candidate characters (e.g., candidate 420) included in the candidate bar illustrated in FIG. 4, such that characters previously displayed as candidate characters included in the candidate bar have now replaced the original character input in the text 505 being composed in message body field 510.

In some embodiments, after one or more candidate characters have been selected from a candidate bar, the contents of the candidate bar may be cleared and/or additional candidate characters may be presented. For instance, in the example illustrated in FIG. 5, a user may have previously selected a candidate character for insertion into the text 505 being composed in message body field 510, and the previous contents of candidate bar 515 may have been cleared and replaced with one or more additional candidate characters, such as candidate character 520. In one or more arrangements, the additional candidate characters displayed in the candidate bar (e.g., candidate bar 515) after a first candidate character is initially selected may be determined and/or suggested by the device providing the user interface based on whether the additional candidate characters are contextually appropriate for insertion after the previously selected candidate character. For instance, in the example illustrated in FIG. 5, candidate character 520 is displayed in candidate bar 515, and if candidate character 520 is selected and inserted into text 505, text 505 will read "ni hao ma" instead of "ni hao." This may be considered to be contextually appropriate, as the addition of candidate character 520 to text 505 (namely, the revision of "ni hao" into "ni hao ma") transforms text 505 into a common expression. Specifically, in the illustrated example, the addition of candidate character 520 to text 505 transforms text 505 from meaning "hello" into meaning "how are you" in Chinese.

Figure 6:
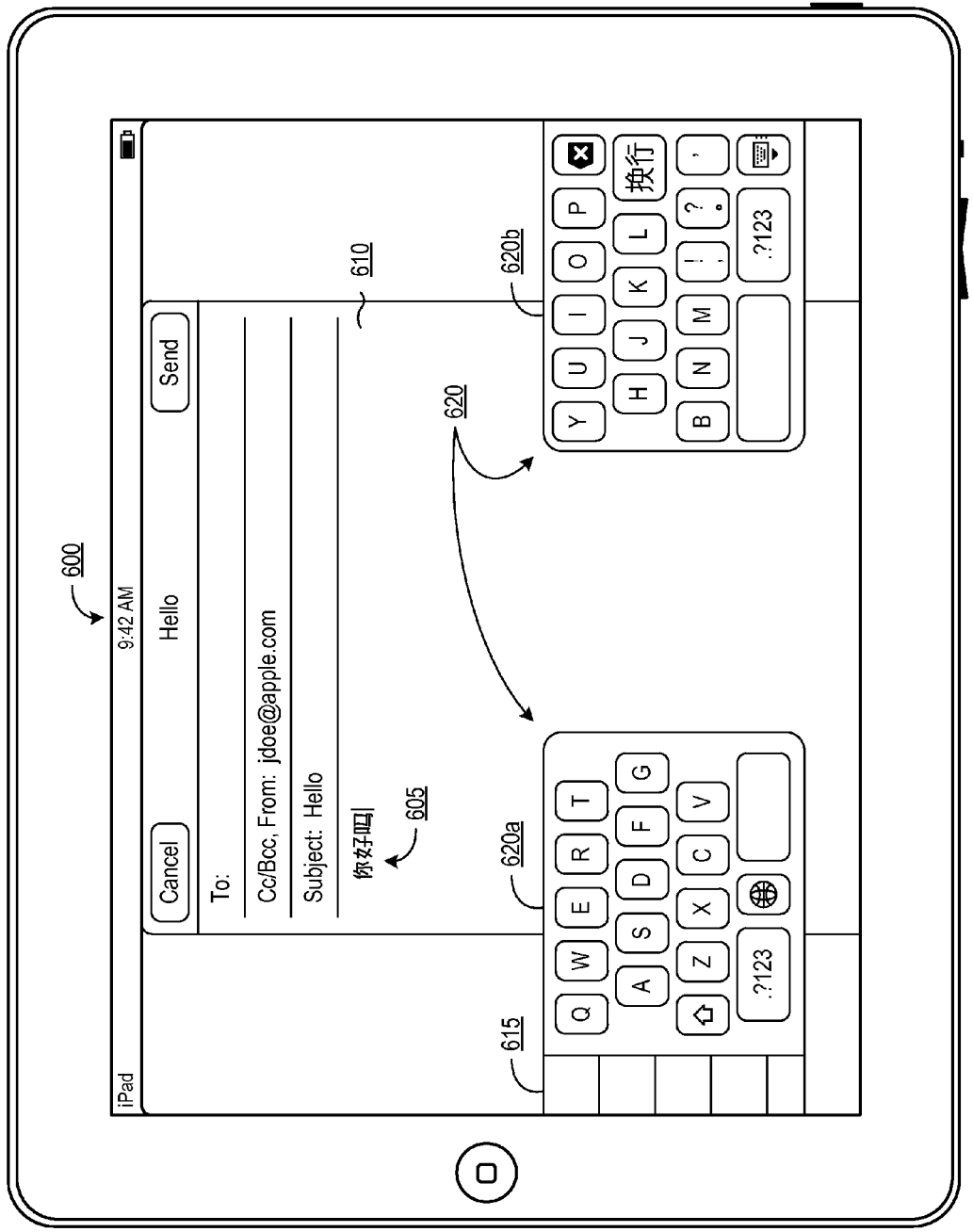

Turning now to FIG. 6, an example user interface 600 is illustrated in which one or more additional candidate characters have been inserted into text being composed. In particular, in the example illustrated in FIG. 6, a user may have selected one of the candidate characters included in the candidate bar illustrated in FIG. 5, and one or more characters previously displayed as candidate characters in the candidate bar have now replaced, have been added to, and/or have otherwise modified the text 605 being composed in message body field 610 of user interface 600. In addition, the contents of the candidate bar 615 have been cleared, such that the device providing user interface 600 is ready to receive additional character input from the user via keyboard panels 620a and/or 620b of on-screen keyboard 620.

As noted above, providing a vertical candidate bar with a split keyboard may allow a user to type more easily on a device using his or her thumbs, while holding the device (namely, the device providing the user interface that includes the candidate bar and the keyboard) with his or her other fingers. An example that illustrates a user two-thumb typing on a user interface 700 that includes an on-screen keyboard 705 and a vertical candidate bar 710 is illustrated in FIG. 7.

Figure 7:
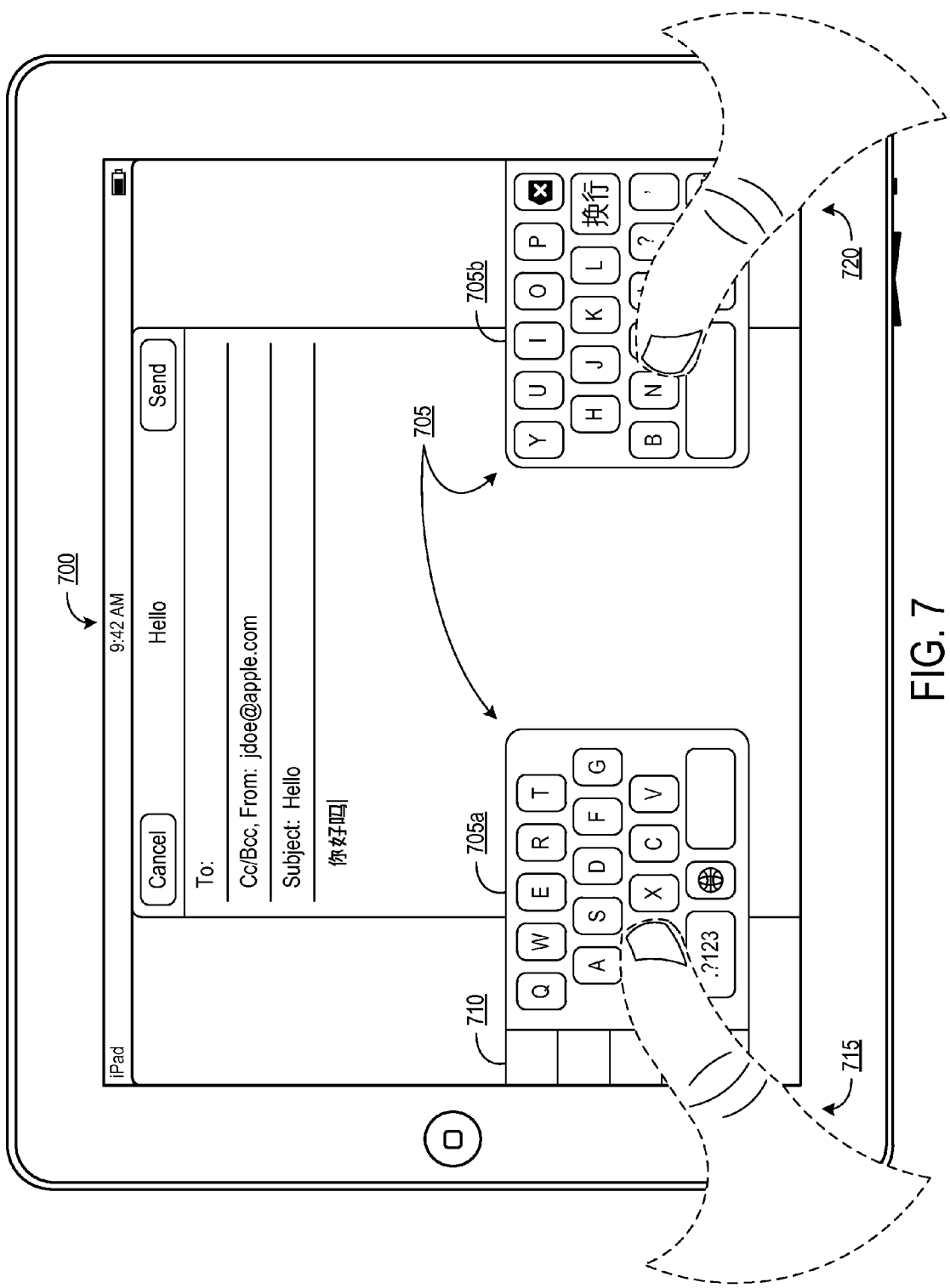
FIG. 7 illustrates an example depicting a user two-thumb typing on a user interface that includes an on-screen keyboard and a vertical candidate bar according to some embodiments.

As seen in FIG. 7, a user is able to type on keyboard portions 705a and 705b of split keyboard 705 using his or her thumbs 715 and 720, while still holding the device displaying user interface 700 using his or her other fingers. The device displaying user interface 700 may, in some embodiments, be a portable communications device, such as a tablet computer. In addition, the user may be able to select one or more candidate characters from vertical candidate bar 710 without moving his or her thumbs 715 and 720 substantially far away from keyboard portions 705a and 705b of split keyboard 705, which may enable the user to type more quickly and/or easily on the keyboard 705. Additionally or alternatively, the user may be able to select one or more candidate characters from vertical candidate bar 710 while continuing to hold the device using his or her other fingers (namely, using his or her index fingers, middle fingers, ring fingers, and/or pinky fingers), which may allow the user to use the device more easily and also may allow the user to type more quickly.

Although several of the example user interfaces discussed above involved typing characters into a messaging application, such an email messaging application or a text messaging application, the vertical candidate bar and other features discussed herein may be implemented in connection with any kind of application. For example, embodiments of the invention may allow a user to provide character input and select character candidates for use in word processing applications, calendaring and/or scheduling applications, photo management applications, video management applications, internet browsing applications, navigation applications, note-taking applications, task management applications, gaming applications, shopping applications, social networking applications, and/or other applications.

Figure 8:
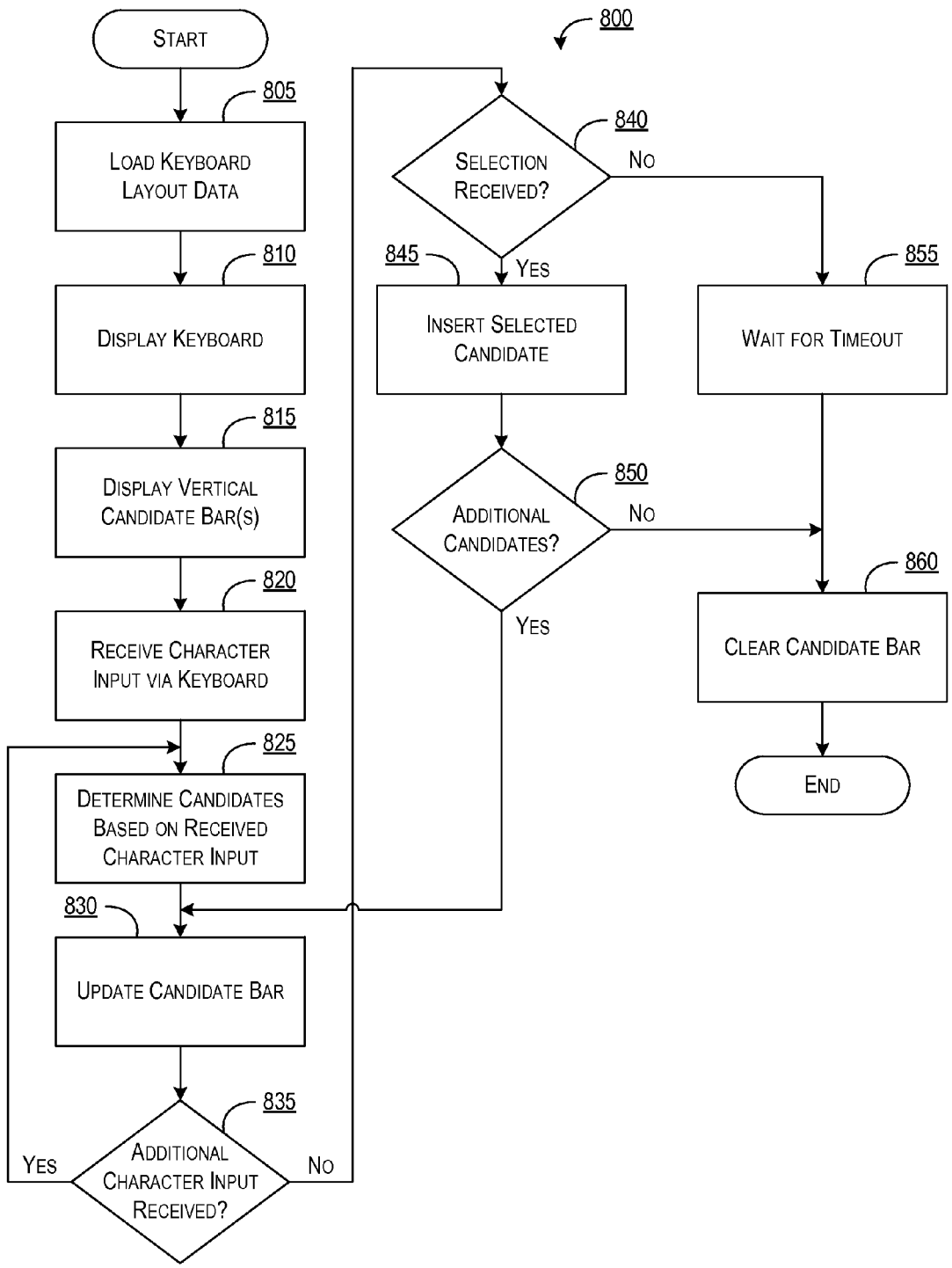
FIG. 8 illustrates a simplified flowchart depicting a method of providing a vertical candidate bar with an on-screen keyboard according to some embodiments.

FIG. 8 illustrates a simplified flowchart 800 depicting a method of providing a vertical candidate bar with an on-screen keyboard according to some embodiments. The processing depicted in FIG. 8 may be implemented in software (e.g., code, instructions, programs) executed by one or more processors, other hardware, or combinations thereof. The software may be stored on a non-transitory computer-readable storage medium. The particular series of processing steps depicted in FIG. 8 is not intended to be limiting.

As seen in FIG. 8, the method may be initiated at step 805, in which keyboard layout data may be loaded. In some embodiments, loading keyboard layout data may be performed by system 100 in response to a selection or user input received by system 100 via input/output subsystem 105. For example, a user may provide a command using a touch-sensitive display screen on a device, such as a tablet computer, requesting to view a user interface that includes an on-screen keyboard, and this may cause the processing in FIG. 8 to be initiated. Additionally or alternatively, in loading keyboard layout data in step 805, system 100 may initialize and/or load information from one or more of keyboard layout subsystem 110, candidate generator subsystem 115, and/or candidate bar layout subsystem 120.

In step 810, a keyboard may be displayed. In some embodiments, the keyboard may be a split keyboard that includes two or more panels of keys. As discussed in the examples above, the two or more panels of keys of the split keyboard may be positioned along opposite edges of the user interface and/or display screen and/or may be overlaid above other content included in the user interface and/or the display screen. For instance, in some arrangements, parts of the user interface and/or other content not associated with the keyboard may be displayed between and/or otherwise appear in the middle of the panels of keys that make up the split keyboard, such that the panels of keys of the split keyboard might not be contiguous.

In step 815, a vertical candidate bar may be displayed. In some embodiments, the vertical candidate bar may be displayed adjacent to one of the panels of keys of the split keyboard. For example, the vertical candidate bar may be positioned along an edge of the user interface that includes the split keyboard, in a region between the edge of the user interface and the adjacent panel of keys of the split keyboard. Additionally or alternatively, the vertical candidate bar may have a vertical axis that is parallel to a vertical axis of the split keyboard and/or parallel to the vertical axes of the panels of keys of the split keyboard. In this manner, the vertical candidate bar may be vertically aligned with the split keyboard relative to the user interface and/or the display screen.

In some embodiments, a vertical candidate bar may be displayed whenever an on-screen keyboard is displayed. For example, the vertical candidate bar might be displayed even if there are no candidates to be displayed, in which case the candidate bar might be empty. In other embodiments, a vertical candidate bar might be displayed only if there are candidates to be displayed. In these embodiments, the candidate bar might not be displayed unless and until character input is received and one or more candidates have been determined based on the character input, for instance, as described with respect to the steps of flowchart 800 discussed below.

In step 820, character input may be received via the keyboard. In some embodiments, the character input may be received from keys on different panels of the split keyboard. For instance, a user may use each of his or her thumbs to select one or more keys on different portions of the split keyboard. Additionally or alternatively, the character input may, in some embodiments, be received in a first alphabet, and the character input may correspond to a phonetic spelling of a linguistic expression that has two or more corresponding spellings in a second alphabet. For example, the character input may be a phonetic spelling of a Chinese word or phrase in a Latin alphabet, but the character input may be ambiguous in that a number of Chinese words and/or phrases may sound like or otherwise match the character input. Accordingly, in this example, a number of Chinese characters may correspond to the character input, and these characters may be presented to a user as candidate characters in subsequent steps of the method.

In step 825, one or more candidate characters may be determined based on the character input received in step 820. In some embodiments, determining the one or more candidate characters may include comparing the received character input with character correspondence information, such as the character correspondence information stored by candidate generator subsystem 115. For example, in some arrangements, candidate generator subsystem 115 may compare the received character input with the stored character correspondence information and subsequently may identify and/or return one or more character candidates. As noted above, the character correspondence information may specify a number of sets of candidates, where each set of candidate corresponds to different character input. Additionally or alternatively, one or more algorithms may be used to determine candidates based on the received character input.

In step 830, the candidate bar may be updated to include the one or more candidate characters determined in step 825. In some embodiments, updating the candidate bar may include adding one or more new candidate characters to the candidate bar and/or removing one or more existing candidate characters from the candidate bar.

In step 835, it may be determined whether additional character input has been received. In some embodiments, if it is determined that additional character input has been received since the character candidates were determined and the candidate bar was updated in steps 825 and 830, then execution of the method may return to step 825 so that additional and/or alternative character candidates may be determined based on the additional character input, and so that the candidate bar may be updated accordingly. In this manner, the candidates included in the candidate bar may be dynamically updated in response to received user input.

Alternatively, if it is determined that additional character input has not been received, then in step 840, it may be determined whether a selection of one of the candidate characters in the candidate bar has been received. In some embodiments, such a selection may be received as a tap in a region of a touch-sensitive display screen in which a particular candidate included in the candidate bar is displayed. For example, a user may select a particular character candidate to be inserted into text being composed by tapping on the particular character candidate in the candidate bar. In some instances, the user first might need to scroll the candidate bar so that the desired candidate is displayed in the candidate bar and available to be selected. As discussed above, in some embodiments, the user may select the character candidate using his or her thumbs, while continuing to hold the device with his or her other fingers and/or without substantially moving his or her thumbs away from the panels of keys that make up the split keyboard.

If it is determined that a selection of one of the candidate characters has been received, then in step 845, the selected candidate may be inserted. In some instances, the selected candidate may include a single character, while in other instances, the selected candidate may include two or more characters. While a particular candidate may include more than one candidate characters, all of the candidate characters included in the selected candidate may be inserted. In some embodiments, inserting the selected candidate may include replacing the character input or a portion thereof, which might have previously been displayed before a candidate was selected, with the candidate character(s) corresponding to the selected candidate in the text being composed on the device. Additionally or alternatively, inserting the selected candidate may include providing the candidate character(s) corresponding to the selected candidate as input to an application on the device that currently has focus, as the application may determine how to process and/or display the candidate character(s) in accordance with its own logic.

Subsequently, it may be determined, in step 850, whether additional candidates are contextually appropriate based on the candidate selected in step 840. For example, in some embodiments, candidate generator subsystem 115 may compare the one or more candidate characters corresponding to the selected candidate with the stored character correspondence information and subsequently may identify and/or return one or more character candidates that are contextually appropriate (e.g., as discussed above with respect to FIG. 5). If candidate generator subsystem 115 identifies one or more character candidates as contextually appropriate, or if it is otherwise determined that one or more character candidates are contextually appropriate, then execution of the method may return to step 830 so that the candidate bar may be updated to include these contextually appropriate character candidates, such that these candidates may be presented to the user and/or be inserted based on subsequent user selections.

On the other hand, if it is determined, in step 840, that a selection of one of the candidate characters has not been received, then in step 855, a timeout clock may be used to allow a certain period of time to elapse, e.g., so as to provide a user with an opportunity to select one of the candidate characters included in the candidate bar. In some additional or alternative embodiments, if it is determined, in step 840, that a selection of one of the candidate characters has not been received, then execution of the method may return to step 835, in which it may be determined whether additional character input has been received.

In step 860, the candidate bar may be cleared. In some embodiments, clearing the candidate bar may include removing all of the candidates currently included in the candidate bar from the candidate bar, so as to allow for the display of candidate characters in connection with future character input.

Figure 9:
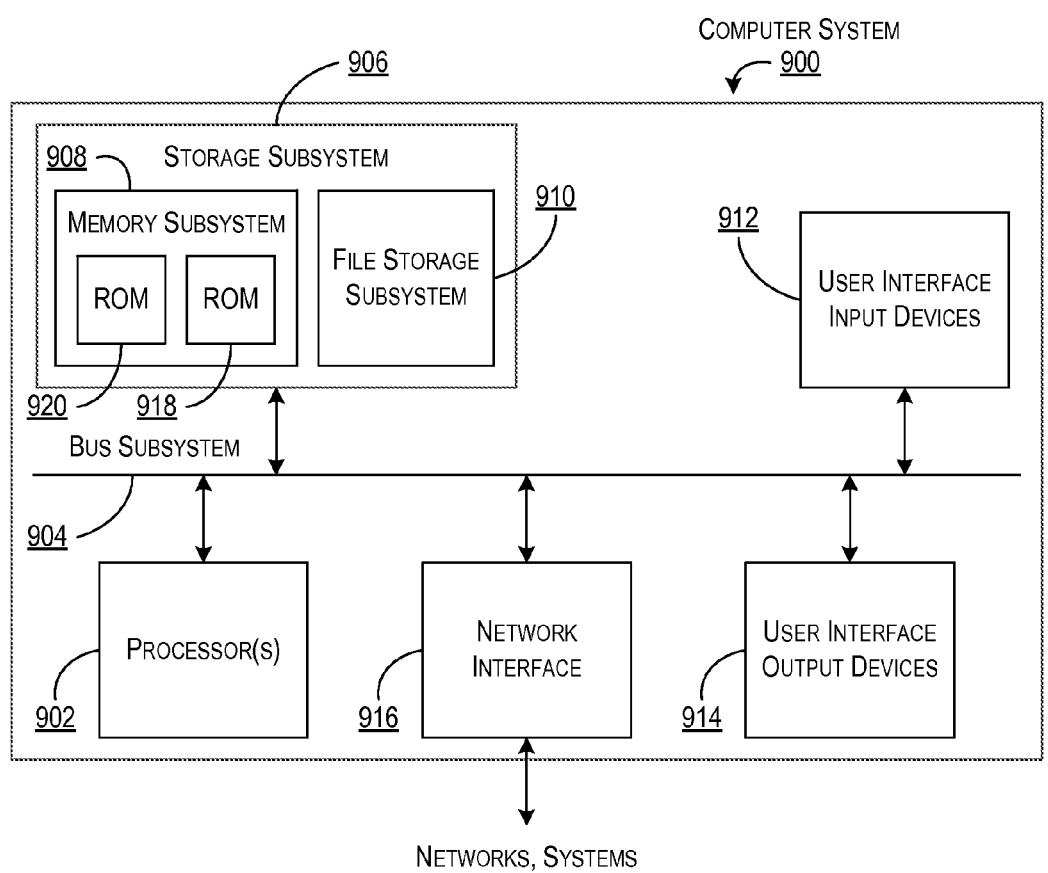
FIG. 9 illustrates a simplified block diagram of a computer system that may incorporate components of a system for providing an on-screen keyboard with a vertical candidate bar according to some embodiments.

As noted above, system 100 of FIG. 1 may incorporate one or more embodiments of the invention and further may provide one or more of the example user interfaces discussed above with respect to FIGS. 2-7 and/or perform one or more of the method steps discussed above with respect to FIG. 8. In addition, system 100 may be incorporated into various systems and devices. For instance, FIG. 9 is a simplified block diagram of a computer system 900 that may incorporate one or more components of system 100 according to some embodiments. As shown in FIG. 9, computer system 900 may include a processor 902 that communicates with a number of peripheral subsystems via a bus subsystem 904. These peripheral subsystems may include a storage subsystem 906, including a memory subsystem 908 and a file storage subsystem 910, user interface input devices 912, user interface output devices 914, and a network interface sub system 916.

Bus subsystem 904 may provide a mechanism for letting the various components and subsystems of computer system 900 communicate with each other as intended. Although bus subsystem 904 is shown schematically as a single bus, alternative embodiments of the bus subsystem may utilize multiple buses.

Processor 1202, which can be implemented as one or more integrated circuits (e.g., as a conventional microprocessor or microcontroller), can control the operation of computer system 900. In various embodiments, processor 902 can execute a variety of programs in response to program code and can maintain multiple concurrently executing programs or processes. At any given time, some or all of the program to be executed can be resident in processor 902 and/or in storage subsystem 906. Through suitable programming, processor 902 can provide various functionalities described above for providing a vertical candidate bar with an on-screen keyboard.

Network interface subsystem 916 may provide an interface to other computer systems and networks. Network interface subsystem 916 may serve as an interface for receiving data from and transmitting data to other systems from computer system 900. For example, network interface subsystem 916 may enable computer system 900 to connect a client device via the Internet. In some embodiments, network interface 916 can include radio frequency (RF) transceiver components for accessing wireless voice and/or data networks (e.g., using cellular telephone technology, advanced data network technology such as 3G, 4G, or EDGE, WiFi (IEEE 802.11 family standards, or other mobile communication technologies, or any combination thereof), GPS receiver components, and/or other components. In some embodiments, network interface 916 may provide wired network connectivity (e.g., Ethernet) in addition to or instead of a wireless interface.

User interface input devices 912 may include a keyboard, pointing devices such as a mouse or trackball, a touchpad, or touch screen incorporated into a display, a scroll wheel, a click wheel, a dial, a button, a switch, a keypad, audio input devices such as voice recognition devices, microphones, and other types of input devices. In general, use of the term "input device" is intended to include all possible types of devices and mechanisms for inputting information to computer system 900. For example, in an iPad®, user input devices 912 may include one or more buttons provided by the iPad®, a touch screen, and the like. A user may provide character input and select one or more candidate characters using one or more input devices 912. A user also may select a candidate character to be inserted into text being composed using one or more of input devices 912.

User interface output devices 914 may include a display subsystem, one or more indicator lights, and/or non-visual displays, such as audio output devices. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from computer system 900. For example, menus and other options for configuring the keyboard and/or the vertical candidate bar may be displayed to a user via an output device.

Storage subsystem 906 may provide a computer-readable storage medium for storing the basic programming and data constructs that provide the functionality of some embodiments. Storage subsystem 906 can be implemented, e.g., using disk, flash memory, or any other storage media in any combination, and can include volatile and/or non-volatile storage as desired. Software (e.g., programs, code modules, instructions, etc.) that when executed by a processor provide the functionalities described herein may be executed by processor(s) 902. Storage subsystem 906 also may provide a repository for storing data used in accordance with some embodiments. Storage subsystem 906 may include memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions may be stored. File storage subsystem 910 may provide persistent (e.g., non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 900 can be of various types, including a personal computer, a personal device (e.g., an iPhone®, an iPad®, etc.), a workstation, a network computer, a mainframe, a kiosk, a server, or any other data processing system. Due to the ever-changing nature of computers and networks, the description of computer system 900 depicted in FIG. 9 is intended only as a specific example. Many other configurations having more or fewer components than the system depicted in FIG. 9 are possible.

Various embodiments described herein can be realized using any combination of dedicated components and/or programmable processors and/or other programmable devices. The various embodiments may be implemented only in hardware, only in software, or using combinations thereof. The various processes described herein may be implemented on the same processor or different processors in any combination. Accordingly, where components are described as being configured to perform certain operations, such configuration can be accomplished, for instance, by designing electronic circuits to perform the operation, by programming programmable electronic circuits, such as microprocessors, to perform the operation, or any combination thereof. Processors can communicate using a variety of techniques, including, but not limited to, conventional techniques for inter-processor communication, and different pairs of processors may use different techniques, or the same pair of processors may use different techniques at different times. Further, while the embodiments described herein may make reference to specific hardware and software components, different combinations of hardware and/or software components may also be used, and particular operations described as being implemented in hardware might also be implemented in software, or vice versa.

The various embodiments discussed herein are not restricted to operation with certain specific data processing environments, but may be free to operate within a plurality of data processing environments. In addition, while the invention has been described with respect to specific embodiments, one skilled in the art will recognize that numerous modifications are possible. For instance, in some configurations, a distributed model may be used to provide one or more of the features discussed herein. For example, in some embodiments, system 100 may be configured as a distributed system where one or more components of system 100 may be distributed and coupled via one or more networks.

Figure 10:
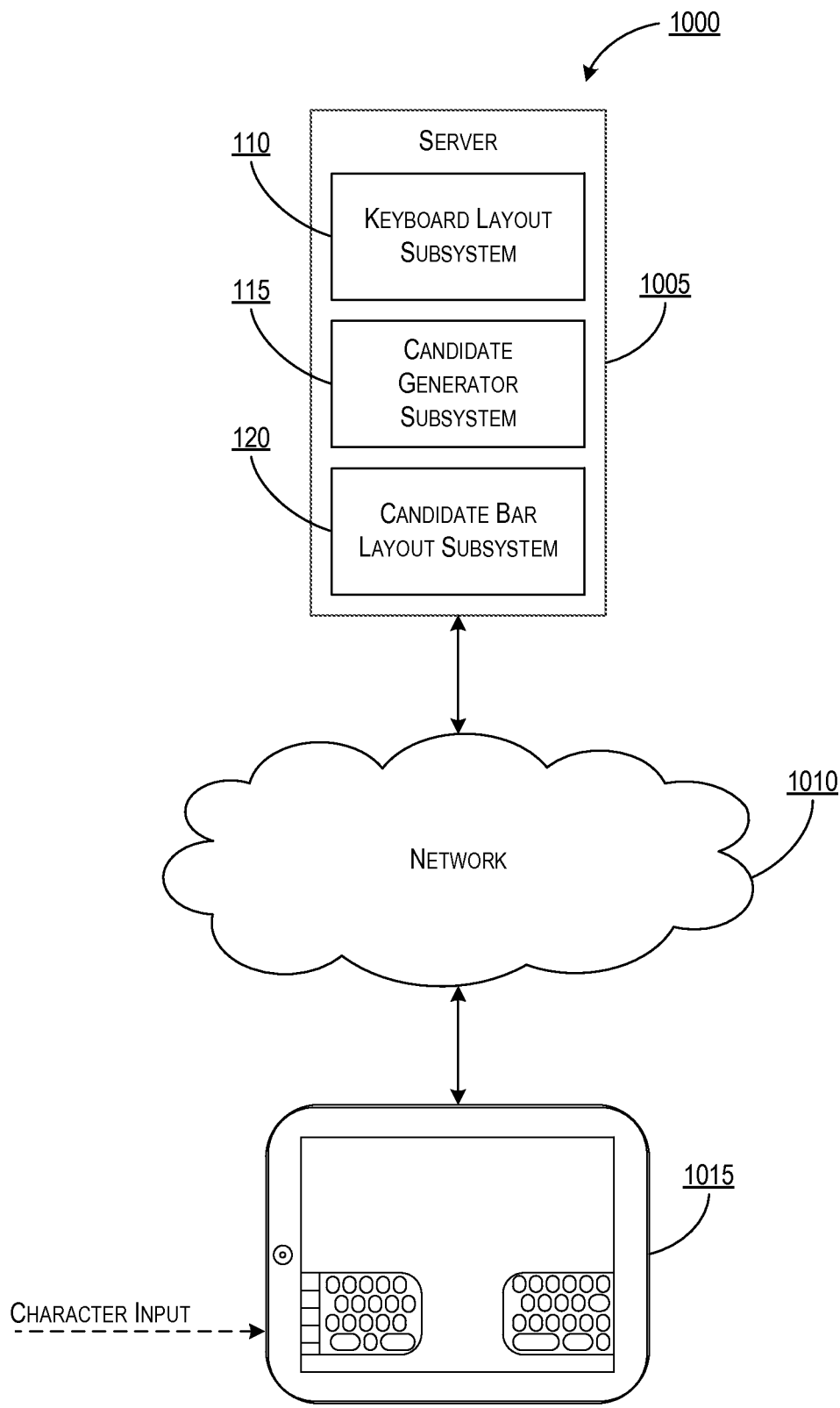
FIG. 10 illustrates a simplified diagram of a distributed system for providing an on-screen keyboard with a vertical candidate bar according to some embodiments.

FIG. 10 illustrates a simplified diagram of a distributed system 1000 for providing an on-screen keyboard with a vertical candidate bar according to some embodiments. In the embodiment illustrated in FIG. 10, keyboard layout subsystem 110, candidate generator subsystem 115, and candidate bar layout subsystem 120 are provided on a server 1005 that is communicatively coupled with a remote client device 1015 via network 1010.

Network 1010 may include one or more communication networks, which can be the Internet, a local area network (LAN), a wide area network (WAN), a wireless or wired network, an Intranet, a private network, a public network, a switched network, or any other suitable communication network. Network 1010 may include many interconnected systems and communication links, including, but not limited to, hardware links, optical links, satellite or other wireless communication links, wave propagation links, or any other ways for communication of information. Various communication protocols may be used to facilitate communication of information via network 1010, including, but not limited to, TCP/IP, HTTP protocols, extensible markup language (XML), wireless application protocol (WAP), protocols under development by industry standard organizations, vendor-specific protocols, customized protocols, and others.

In the configuration illustrated in FIG. 10, a user of client device 1015 may request a user interface that includes a keyboard. Upon receiving the request, device 1015 may communicate with server 1005 via network 1010. Keyboard layout subsystem 110 and/or candidate bar layout subsystem 120 located on server 1005 then may cause an on-screen keyboard and/or a vertical candidate bar to be provided on device 1015. Subsequently, character input may be received at device 1015, and the character input may be sent to server 1005 via network 1010 for processing. Candidate generator subsystem 115 and candidate bar layout subsystem 120 may cause one or more character candidates to be presented to the user at device 1015 based on the character input. Additionally or alternatively, these subsystems may cause the candidate bar to be updated as additional character input is received and/or may cause candidate(s) to be inserted, as in the examples discussed above.

In the configuration illustrated in FIG. 10, keyboard layout subsystem 110, candidate generator subsystem 115, and candidate bar layout subsystem 120 are located remotely from client device 1015. Server 1005, including keyboard layout subsystem 110, candidate generator subsystem 115, and candidate bar layout subsystem 120, may provide on-screen keyboards and/or candidate bars for client device 1015. In some embodiments, server 1005 may provide on-screen keyboards and/or candidate bars for multiple clients. The multiple clients may be served concurrently or in a serialized manner. In some embodiments, the services provided by server 1005 may be offered as web-based or cloud services or under a Software as a Service (SaaS) model.

Various different distributed system configurations are possible, which may be different from distributed system 1000 depicted in FIG. 10. For example, in some embodiments, keyboard layout subsystem 110, candidate generator subsystem 115, and candidate bar layout subsystem 120 may all be located remotely from each other. The embodiment illustrated in FIG. 10 is thus only one example of a system that may incorporate some embodiments and is not intended to be limiting.

Embodiments described herein provide a vertical candidate bar with an on-screen keyboard. Certain embodiments can enable a user to type more easily and efficiently on an on-screen keyboard provided by a device, such as a tablet computer. As discussed above, some embodiments may allow a user to select candidate characters from a candidate bar without substantially moving their thumbs away from one or more panels of keys that make up the on-screen keyboard. Additionally or alternatively, some embodiments may allow a user to select candidate characters from a candidate bar with their thumb(s) while they continue to hold the device in the palms of their hands with their other fingers, such as their index fingers, middle fingers, ring fingers, and/or pinky fingers. These features may allow a user to type more quickly and with less interruption.

Thus, although the invention has been described with respect to specific embodiments, it will be appreciated that the invention is intended to cover all modifications and equivalents within the scope of the following claims.

What is claimed is:

1. A computing device, comprising:
a memory;
a touch-sensitive display screen; and
one or more processors coupled to the memory and the touch-sensitive display screen, the one or more processors configured to:
display a first panel of a split keyboard in a first region of the touch-sensitive display screen, the first region of the touch-sensitive display screen being positioned along a first side of the touch-sensitive display screen, wherein the first panel includes a plurality of character keys from a first side of a respective keyboard;
display a second panel of the split keyboard in a second region of the touch-sensitive display screen, the second region of the touch-sensitive display screen being positioned along a second side of the touch-sensitive display screen different from the first side, wherein the second panel includes a plurality of character keys from a second side of the respective keyboard;
receive, via the first panel of the split keyboard and the second panel of the split keyboard, character input; and
display a vertical candidate bar adjacent to the first panel of the split keyboard, between the first panel of the split keyboard and an edge of the touch-sensitive display screen on the first side of the touch-sensitive display screen, the vertical candidate bar having a single column of one or more candidates determined based on the character input.

2. The computing device of claim 1, wherein the one or more processors are further configured to:
display content on the touch-sensitive display screen, wherein the first panel of the split keyboard and the second panel of the split keyboard are displayed as an overlay over at least a portion of the content.

3. The computing device of claim 1, wherein the one or more processors are further configured to:
scroll the vertical candidate bar based on input received via the touch-sensitive display screen.

4. The computing device of claim 1,
wherein the character input is received in a first alphabet and corresponds to a linguistic expression having at least two corresponding spellings in a second alphabet different from the first alphabet, and
wherein the one or more processors are further configured to:
display a first spelling of the at least two corresponding spellings of the linguistic expression as including a series of vertically arranged characters.

5. The computing device of claim 1,
wherein the character input is received in a first alphabet and corresponds to a linguistic expression having at least two corresponding spellings in a second alphabet different from the first alphabet, and
wherein the first alphabet is a Latin alphabet and the second alphabet is a non-Latin alphabet.

6. The computing device of claim 1, wherein the one or more processors are further configured to:
clear contents of the vertical candidate bar based on receiving a selection of a candidate of the one or more candidates.

7. A non-transitory computer readable storage medium storing a plurality of instructions configured for execution by a computing device with one or more processors and a touch-sensitive display screen, the plurality of instructions comprising instructions that when executed cause the computing device to:

display a first panel of a split keyboard in a first region of the touch-sensitive display screen, the first region of the touch-sensitive display screen being positioned along a first side of the touch-sensitive display screen, wherein the first panel includes a plurality of character keys from a first side of a respective keyboard;

display a second panel of the split keyboard in a second region of the touch-sensitive display screen, the second region of the touch-sensitive display screen being positioned along a second side of the touch-sensitive display screen different from the first side, wherein the second panel includes a plurality of character keys from a second side of the respective keyboard;

receive, via the first panel of the split keyboard and the second panel of the split keyboard, character input; and display a vertical candidate bar adjacent to the first panel of the split keyboard, between the first panel of the split keyboard and an edge of the touch-sensitive display screen on the first side of the touch-sensitive display screen, the vertical candidate bar having a single column of one or more candidates determined based on the character input.

8. The computer readable storage medium of claim 7, wherein the plurality of instructions include instructions that when executed cause the computing device to:
display content on the touch-sensitive display screen, wherein the first panel of the split keyboard and the second panel of the split keyboard are displayed as an overlay over at least a portion of the content.

9. The computer readable storage medium of claim 7, wherein the plurality of instructions include instructions that when executed cause the computing device to:
scroll the vertical candidate bar based on input received via the touch-sensitive display screen.

10. The computer readable storage medium of claim 7, wherein the character input is received in a first alphabet and corresponds to a linguistic expression having at least two corresponding spellings in a second alphabet different from the first alphabet, and
wherein the plurality of instructions include instructions that when executed cause the computing device to:
display a first spelling of the at least two corresponding spellings of the linguistic expression as including a series of vertically arranged characters.

11. The computer readable storage medium of claim 7, wherein the character input is received in a first alphabet and corresponds to a linguistic expression having at least two corresponding spellings in a second alphabet different from the first alphabet, and
wherein the first alphabet is a Latin alphabet and the second alphabet is a non-Latin alphabet.

12. The computer readable storage medium of claim 7, wherein the plurality of instructions include instructions that when executed cause the computing device to:
clear contents of the vertical candidate bar based on receiving a selection of a candidate of the one or more candidates.

13. A method, comprising:
at a computing device with a memory, a touch-sensitive display screen, and one or more processors coupled to the memory and the touch-sensitive display screen:
displaying a first panel of a split keyboard in a first region of the touch-sensitive display screen, the first region of the touch-sensitive display screen being positioned along a first side of the touch-sensitive display screen, wherein the first panel includes a plurality of character keys from a first side of a respective keyboard;
displaying a second panel of the split keyboard in a second region of the touch-sensitive display screen, the second region of the touch-sensitive display screen being positioned along a second side of the touch-sensitive display screen different from the first side, wherein the second panel includes a plurality of character keys from a second side of the respective keyboard;
receiving, via the first panel of the split keyboard and the second panel of the split keyboard, character input; and
displaying a vertical candidate bar adjacent to the first panel of the split keyboard, between the first panel of the split keyboard and an edge of the touch-sensitive display screen on the first side of the touch-sensitive display screen, the vertical candidate bar having a single column of one or more candidates determined based on the character input.

14. The method of claim 13, including:
displaying content on the touch-sensitive display screen, wherein the first panel of the split keyboard and the second panel of the split keyboard are displayed as an overlay over at least a portion of the content.

15. The method of claim 13, including:
scrolling the vertical candidate bar based on input received via the touch-sensitive display screen.

16. The method of claim 13,
wherein the character input is received in a first alphabet and corresponds to a linguistic expression having at least two corresponding spellings in a second alphabet different from the first alphabet, and
wherein the method includes:
displaying a first spelling of the at least two corresponding spellings of the linguistic expression as including a series of vertically arranged characters.

17. The method of claim 13,
wherein the character input is received in a first alphabet and corresponds to a linguistic expression having at least two corresponding spellings in a second alphabet different from the first alphabet, and
wherein the first alphabet is a Latin alphabet and the second alphabet is a non-Latin alphabet.

18. The method of claim 13, including:
clearing contents of the vertical candidate bar based on receiving a selection of a candidate of the one or more candidates.

* * * * *